United States Patent
Zhao et al.

(10) Patent No.: US 9,491,526 B1
(45) Date of Patent: Nov. 8, 2016

(54) DYNAMIC DATA CENTER NETWORK WITH A MESH OF WAVELENGTH SELECTIVE SWITCHES

(71) Applicant: Google Inc., Mountain View, CA (US)

(72) Inventors: Xiaoxue Zhao, Fremont, CA (US);
Bikash Koley, Sunnyvale, CA (US);
Amin Vahdat, Los Altos, CA (US)

(73) Assignee: Google Inc., Mountain View, CA (US)

( * ) Notice: Subject to any disclaimer, the term of this patent is extended or adjusted under 35 U.S.C. 154(b) by 93 days.

(21) Appl. No.: 14/495,615

(22) Filed: Sep. 24, 2014

Related U.S. Application Data (60) Provisional application No. 61/991,791, filed on May 12, 2014.

(51) Int. Cl.
*H04J 14/00* (2006.01)
*H04Q 11/00* (2006.01)

(52) U.S. Cl.
CPC ...... *H04Q 11/0005* (2013.01); *H04Q 11/0062* (2013.01); *H04Q 2011/0052* (2013.01); *H04Q 2011/0086* (2013.01)

(58) Field of Classification Search
CPC ............. H04J 14/0257; H04J 14/0204; H04J 14/0267; H04J 14/0212
USPC .......................................................... 398/45
See application file for complete search history.

(56) References Cited

U.S. PATENT DOCUMENTS

| | | | | |
|---|---|---|---|---|
| 5,953,141 A | * | 9/1999 | Liu ..................... | H04J 14/0206 385/24 |
| 7,340,169 B2 | * | 3/2008 | Ovadia ............... | H04L 12/5695 398/45 |
| 8,867,915 B1 | * | 10/2014 | Vahdat ................. | H04B 10/27 398/55 |
| 9,319,264 B1 | * | 4/2016 | Poutievski ......... | H04L 29/08315 |
| 9,332,323 B2 | * | 5/2016 | Zhang ................ | H04Q 11/0005 |
| 9,332,324 B2 | * | 5/2016 | Xu ...................... | H04Q 11/0005 |

(Continued)

OTHER PUBLICATIONS

Adams, Roadm andWavelength Selective Switches Perspectives for Fiber Optic Manufacturing Test Engineering White Paper. 2008. 8 pages.

(Continued)

*Primary Examiner* — David Payne
*Assistant Examiner* — Tanya Motsinger
(74) *Attorney, Agent, or Firm* — McDermott Will & Emery LLP (57) ABSTRACT

According to at least one aspect, a network system includes a wavelength selective switch (WSS) mesh network, multiple dense wavelength division multiplexing (DWDM) multiplexers/de-multiplexers, and a controller. The WSS mesh network includes a plurality of WSS components. Each WSS component includes a common port and multiple switching ports. The plurality of WSS components are coupled to each other through corresponding switching ports. Each DWDM multiplexer/de-multiplexer is coupled to one of multiple sets of servers via a respective top tier switch and respective aggregation nodes and coupled to a common port of a WSS component of the WSS mesh network. The controller is configured to obtain indications of communication bandwidth demand for communications between the multiple sets of servers, determine a configuration for the WSS mesh network based on the obtained indications of communication bandwidth demand, and cause the WSS components and the top tier switches to be configured according to the determined configuration.

19 Claims, 7 Drawing Sheets

(56) References Cited

U.S. PATENT DOCUMENTS

| | | | | |
|---|---|---|---|---|
| 2003/0077025 A1* | 4/2003 | Zhang | G02B 6/124 | 385/17 |
| 2004/0213571 A1* | 10/2004 | Penninckx | H04Q 11/0005 | 398/56 |
| 2005/0044195 A1* | 2/2005 | Westfall | H04L 49/101 | 709/223 |
| 2007/0269211 A1* | 11/2007 | Doerr | H04J 14/0209 | 398/49 |
| 2008/0181605 A1* | 7/2008 | Palacharla | H04J 14/0204 | 398/50 |
| 2009/0041457 A1* | 2/2009 | Maki | H04J 14/0204 | 398/45 |
| 2010/0142961 A1* | 6/2010 | Wisseman | H04J 14/0212 | 398/83 |
| 2011/0085801 A1* | 4/2011 | Palacharla | H04J 14/0212 | 398/48 |
| 2011/0262142 A1* | 10/2011 | Archambault | H04J 14/02 | 398/83 |
| 2012/0008945 A1* | 1/2012 | Singla | H04J 14/0204 | 398/49 |
| 2012/0114332 A1* | 5/2012 | Zhang | H04J 14/0204 | 398/48 |
| 2013/0198305 A1* | 8/2013 | Veillette | H04L 51/00 | 709/206 |
| 2014/0119728 A1* | 5/2014 | Zhang | H04J 14/0204 | 398/48 |
| 2014/0270761 A1* | 9/2014 | Xu | H04Q 11/0005 | 398/45 |
| 2014/0286637 A1* | 9/2014 | Kikuchi | H04J 14/0212 | 398/48 |
| 2015/0098700 A1* | 4/2015 | Zhu | H04Q 11/0005 | 398/48 |
| 2015/0222969 A1* | 8/2015 | Urata | H04Q 11/0062 | 398/48 |
| 2016/0091685 A1* | 3/2016 | Raza | G02B 6/4452 | 398/19 |

OTHER PUBLICATIONS

Chen et al. OSA: An Optical Switching Architecture for Data Center Networks with Unpreecdented Flexibility. 2013. 14 pages.

Gumaste, et al. A Novel Node Architecture for Light-trail Provisioning in Mesh WDM Metro Networks. 2008. 3 pages.

Singla, et. al. Proteus: A Topology Malleable Data Center Network. Hotnets. Feb. 10, 2010. 6 pages.

White Paper. A Performance Comparison of WSS Switch Engine Technologies. May 2009. 24 pages.

* cited by examiner

DYNAMIC DATA CENTER NETWORK WITH A MESH OF WAVELENGTH SELECTIVE SWITCHES

RELATED APPLICATION

The present application claims priority to U.S. Provisional Application No. 61/991,791, entitled "DYNAMIC DATA CENTER NETWORK WITH A MESH OF WAVELENGTH SELECTIVE SWITCHES" and filed on May 12, 2014, which is incorporated herein by reference in its entirety for all purposes.

FIELD OF THE DISCLOSURE

The present disclosure relates generally to the field of computer networks. In particular, the present disclosure relates to data center networks.

BACKGROUND

Internet-based services are provided by data centers housing computer systems and for serving end-user requests. As people and businesses rely more and more on online-services, service continuity of data centers becomes crucial in handling daily business for many. A typical data center houses hundreds of thousands of servers coupled to each other through a network. Managing such huge networks of computing resources is increasingly a challenge as the demand for Internet-based services is continuously on the rise.

SUMMARY

According to at least one aspect, a network system includes a wavelength selective switch (WSS) mesh network, multiple dense wavelength division multiplexing (DWDM) multiplexers/de-multiplexers, and a controller. The WSS mesh network includes a plurality of WSS components. Each WSS component includes a common port and multiple switching ports. The plurality of WSS components are coupled to each other through corresponding switching ports. Each DWDM multiplexer/de-multiplexer is coupled to one of multiple sets of servers via a respective top tier switch and respective aggregation nodes and coupled to a common port of a WSS component of the WSS mesh network. The controller is configured to obtain indications of communication bandwidth demand for communications between the multiple sets of servers, determine a configuration for the WSS mesh network based on the obtained indications of communication bandwidth demand, and cause the WSS components and the top tier switches to be configured according to the determined configuration.

According to at least one other aspect, a process controls a network system including a wavelength selective switch (WSS) mesh network and multiple dense wavelength division multiplexing (DWDM) multiplexers/de-multiplexers coupling multiple sets of servers. The WSS mesh network includes a plurality of WSS components. Each WSS component includes a common port and multiple switching ports. The plurality of WSS components are coupled to each other through corresponding switching ports. Each DWDM multiplexer/de-multiplexer is coupled to one of multiple sets of servers via a respective top tier switch and respective aggregation nodes and coupled to a common port of a WSS component of the WSS mesh network. The process includes obtaining indications of communication bandwidth demand for communications between the multiple sets of servers, determining a configuration for the WSS mesh network based on the obtained indications of communication bandwidth demand, and causing the WSS components and the top tier switches to be configured according to the determined configuration.

According to yet at least one other aspect, a computer readable medium stores computer code instructions thereon for controlling a network system. The network system includes a wavelength selective switch (WSS) mesh network and multiple dense wavelength division multiplexing (DWDM) multiplexers/de-multiplexers coupling multiple sets of servers. The WSS mesh network includes a plurality of WSS components. Each WSS component includes a common port and multiple switching ports. The plurality of WSS components are coupled to each other through corresponding switching ports. Each DWDM multiplexer/de-multiplexer is coupled to one of multiple sets of servers via a respective top tier switch and respective aggregation nodes and coupled to a common port of a WSS component of the WSS mesh network. The computer code instructions when executed by a processor cause an apparatus to obtain indications of communication bandwidth demand for communications between the multiple sets of servers, determine a configuration for the WSS mesh network based on the obtained indications of communication bandwidth demand, and cause the WSS components and the top tier switches to be configured according to the determined configuration.

DETAILED DESCRIPTION

In a data center network architecture, a data center network can include multiple groups or blocks of servers coupled to each other through multiple dense wavelength-division multiplexing (DWDM) multiplexers/de-multiplexers and a wavelength selective switch (WSS) mesh network. The WSS mesh network includes a plurality of wavelength selective switches (WSSs) that are coupled to each other through their switching ports. Each DWDM multiplexer/de-multiplexer is coupled to one of the multiple groups of servers via respective aggregation nodes and coupled to a common port of a WSS of the WSS mesh network through a respective pair of single-mode fibers. A DWDM multiplexer/de-multiplexer is configured to multiplex/demultiplex many wavelength channels carrying up to hundreds of Gigabits per second or more of data over the respective pair of single-mode fibers. A wavelength channel refers to a communication channel defined by a given wavelength used to carry communications associated with that channel through a wavelength division multiplexed network. The WSS mesh network is configured to route wavelength channels carrying data traffic between server groups. A controller can dynamically allocate bandwidth to communication routes within the network based on communication bandwidth demand between respective groups of servers. The controller is configured to obtain data indicative of communication bandwidth demand for communications between the multiple groups of servers. Based on obtained indications of communication bandwidth demand, the controller can determine a configuration for the WSS mesh network and cause the WSSs and the top-tier switches coupled to the DWDM multiplexers/de-multiplexers to be configured according to the determined configuration.

The processes and network system described herein allow dynamic configurations of topology and communication bandwidth allocation between computing resources residing in different clusters. In some implementations, the dynamic allocation of communication bandwidth allows efficient use of computing resources, better performance, and less energy consumption by the data center network. In some implementations, an optical layer employing a WSS mesh and DWDM multiplexers/de-multiplexers in a data center network allows increased network scalability. In some implementations, the optical layer including the WSS mesh and the DWDM multiplexers/de-multiplexers results in fewer physical links between elements of the data center network and therefore reduced hardware and network management cost.

Figure 1:
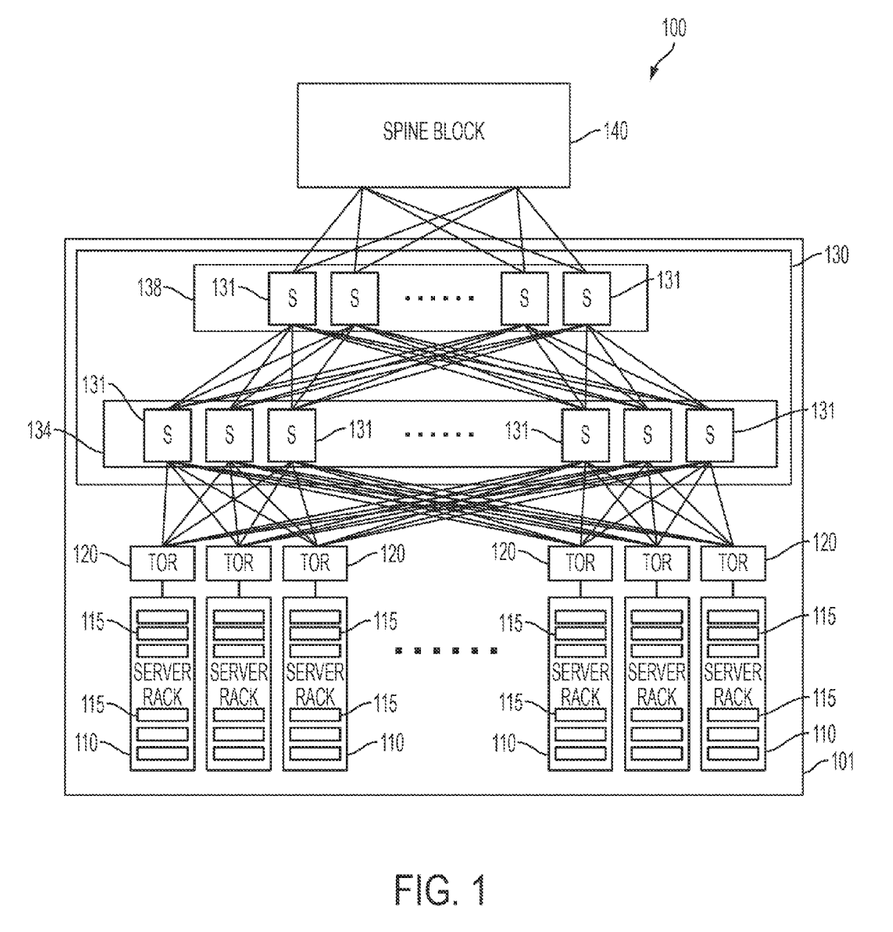
FIG. 1 shows an example architecture of a generic data center network.

FIG. 1 shows an example architecture of a generic data center network 100. The data center network 100 includes a super block 101 and a spine block 140. The super block includes a plurality of server racks 110, a plurality of top-of-rack (TOR) switches 120, and a switching fabric 130.

Each of the server racks 110 includes multiple servers 115. The servers 115 may be content servers storing data content, cloud computing servers, application servers hosting instances of applications associated with frontend and backend services, other types of servers, or combinations thereof. Frontend services include services provided to end-users such as social networking, email, Internet search, financial transactions, electronic commerce, streaming services, and other services. Backend services include data center based services such as crawling, indexing, copying, etc. The servers 115 are configured to serve incoming requests from end-users or other servers 115 in the data center network 100. In serving an incoming request, a server 115 may communicate with another server 115 to exchange data, software, or any other type of information. For instance, when serving a request from an end-user for accessing a social media account, the server 115 receiving the request may communicate with other servers 115 to obtain information associated with other accounts linked to the requesting end-user's account. Also, multiple software modules of an application instance may be distributed among multiple servers 115. In such case, a request destined to the application instance may be served by multiple servers 115 cooperating in some way. A typical data center such as the data center 100 is designed to allow inter-server rack communications (i.e., communications between servers 115 residing in different server racks 110). Inter-server rack communications between different servers 115 not in the same server rack 110 is allowed through the TOR switches 120, the switch fabric 130, the routers 140, and communications links in between.

Each TOR switch 120 is associated with a corresponding server rack 110. In particular, each TOR switch 120 couples the corresponding server rack 110 to the switching fabric 130 also referred to as the aggregation fabric 130. The switching fabric 130 includes multiple switches 131. The switches 131 can be arranged in multiple switching layers such as switching layers 134 and 138. As shown, in some implementations, each of the TOR switches 120 is coupled to all of the switches 131 in the switching layer 134. Each of the switches 131 in the switching layer 134 is coupled to all the switches 131 in the layer 138. Each of the switches 131 in the switching layer 138 is coupled to all the routers 140. In some implementations, the TOR switches 120 are not fully connected with the switches 131 in the switching layer 134. Also, the switches 131 of the switching layer 134 can be not fully connected with the switches 131 in the switching layer 138. The spine block 140 is configured to switch data traffic between the super block 101 and other super blocks of the data center. Communications between servers 115 within the same server rack 110 are carried out through a respective TOR switch 120 without passing through the switching fabric 130.

A data center network such as the data center network 100 can include hundreds of thousands of servers 115 coupled to each other through the switching fabric 130 and the routers 140. Given the complexity of the data center network 100 in terms of the amount of wiring and physical layout effort of a fully connected network fabric, the data center network 100 is typically designed to the scale of the data center on day one. Incremental build or retrofit of the network infrastructure after initial design is often not feasible without extensive planning and preparation in the initial design. However, the actual capacity demand on day one could be much smaller than the expected capacity demand few months or few years later. In fact, at the time of designing a data center network such as the data center network 100 it is difficult to accurately predict how usage capacity demand may vary over time.

At any given time, the communication bandwidth between some of the servers 115 may be under-used while at the same time other servers may be hungry for unused bandwidth. In some existing data center networks, one common approach to work around these challenges is to oversubscribe the network when moving up the layers in the fabric, especially at top-of-rack (ToR) switches 120. For hierarchical networks, the oversubscription ratio of a network switch is defined as the total downlink bandwidth over total uplink bandwidth. The larger the oversubscription ratio, the smaller the average bandwidth is among distributed server racks 110. The degree of oversubscription is often chosen as a compromise between application performance and the overall network fabric cost. With such approach, designing a data center network is still a challenge since the oversubscription ratios are fixed and, as such, communication bandwidth distribution among pairs of server racks 110 or pairs of servers is static.

Figure 2:
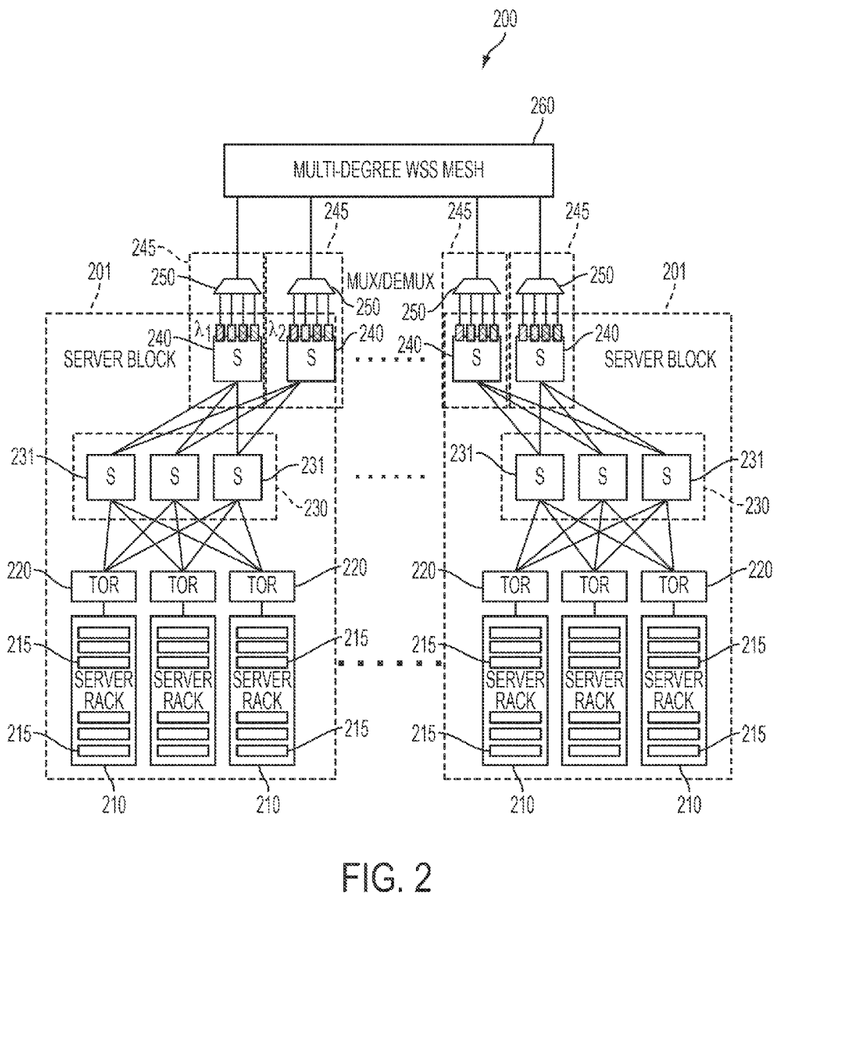
FIG. 2 shows an example architecture of a data center network allowing dynamic allocation of communication bandwidth.

FIG. 2 shows an example architecture of a data center network 200 allowing dynamic allocation of communication bandwidth. The data center network 200 includes multiple server groups 201, also referred to as server blocks or server clusters, multiple dense wavelength-division multiplexing (DWDM) multiplexers/de-multiplexers 250, and a wavelength selective switching (WSS) mesh network 260.

Each server group 201 includes multiple server racks 210, multiple TOR switches 220, a plurality of aggregation switches 230, and top tier switches 240. Each server rack 210 includes multiple servers 215. The servers 215 are similar to the servers 115 described with respect to FIG. 1.

Each TOR switch 220 is associated with a respective server rack 210 and is configured to direct data traffic from/to the respective server rack 220. In particular, each TOR switch 220 couples the corresponding server rack 210 to an aggregation fabric 230 including multiple aggregation switches 231. The aggregation fabric 230 couples the TOR switches 220 in each server group 201 to each other and to the top tier switches 240. The aggregation fabric 230 allows communications between different server racks 210 in the same server group 201. The aggregation fabric 230 in a given server group 201 also directs inter-server group data traffic from/to TOR switches 220 to/from the top tier switches 240 and the WSS mesh network 260 to facilitate communications between distinct server groups 201. In some implementations, the top tier switch 240 includes a data packet switch with a DWDM optical interface facing the DWDM multiplexers/de-multiplexers 250. The DWDM optical interface can include DWDM-enabled ports capable of transmitting (or receiving) DWDM wavelength channels. In other implementations, the top tier switch 240 includes a data packet switch coupled to a respective DWDM multiplexer/de-multiplexer 250 through a media converter. The media converter may be an optical-electrical-optical converter configured to convert non-DWDM wavelengths to DWDM wavelengths and vice versa.

In general, a server group 201 includes a set of servers 215 coupled to each other through multiple network elements such as switches. In some implementations, the servers 215 may or may not be arranged in server racks 210. The set of servers 215 in each server group 201 can be fully-connected or otherwise connected in a way that each server 215 is capable of communicating with any other server 215 in the same server group 201.

Each server group 201 is coupled to the WSS mesh network 260 through DWDM multiplexer/de-multiplexers 250. Each DWDM multiplexer/de-multiplexer 250 is configured to multiplex optical wavelength channels received from a respective top tier switch 240 into a single fiber for sending to the WSS mesh network 260. The DWDM multiplexer/de-multiplexer 250 also demultiplexes multiplexed wavelengths received from the WSS mesh network 260 into multiple single wavelength channels. The demultiplexed wavelength channels are then sent to a respective top tier switch 240 for forwarding to a TOR switch 220 via the aggregation fabric 230.

The combination of a top tier switch 240 and a respective DWDM multiplexer/de-multiplexer 250 is referred to hereinafter as a DWDM switch 245. The DWDM switch 245 may be a single device or a combination of two or more devices. The DWDM switch 245 is configured to perform the processes such as electro-optical conversion (if needed), wavelength conversion, and wavelength multiplexing/de-multiplexing performed by the respective top tier switch 240, the media converter (if any), and the respective DWDM multiplexer/de-multiplexer 250. The DWDM switch 245 can also be configured to apply a route-wavelength correlation mapping, converting received communications to wavelengths selected based on the server group to which the communications are destined.

The WSS mesh network 260 includes a plurality of wavelength selective switches (WSSs) (not shown but discussed in more detail with respect to FIGS. 3A, 3B, and 4) that are coupled to each other. Each WSS of the WSS mesh network 260 is coupled to a respective DWDM multiplexer/de-multiplexer 250 through a pair of single-mode fibers. The WSS mesh network 260 is configured to route wavelength channels exchanged between different server groups 201.

The structure and functionalities of the WSS mesh network 260 is discussed in more details below with respect to FIGS. 3A, 3B, and 4.

Figure 3A:
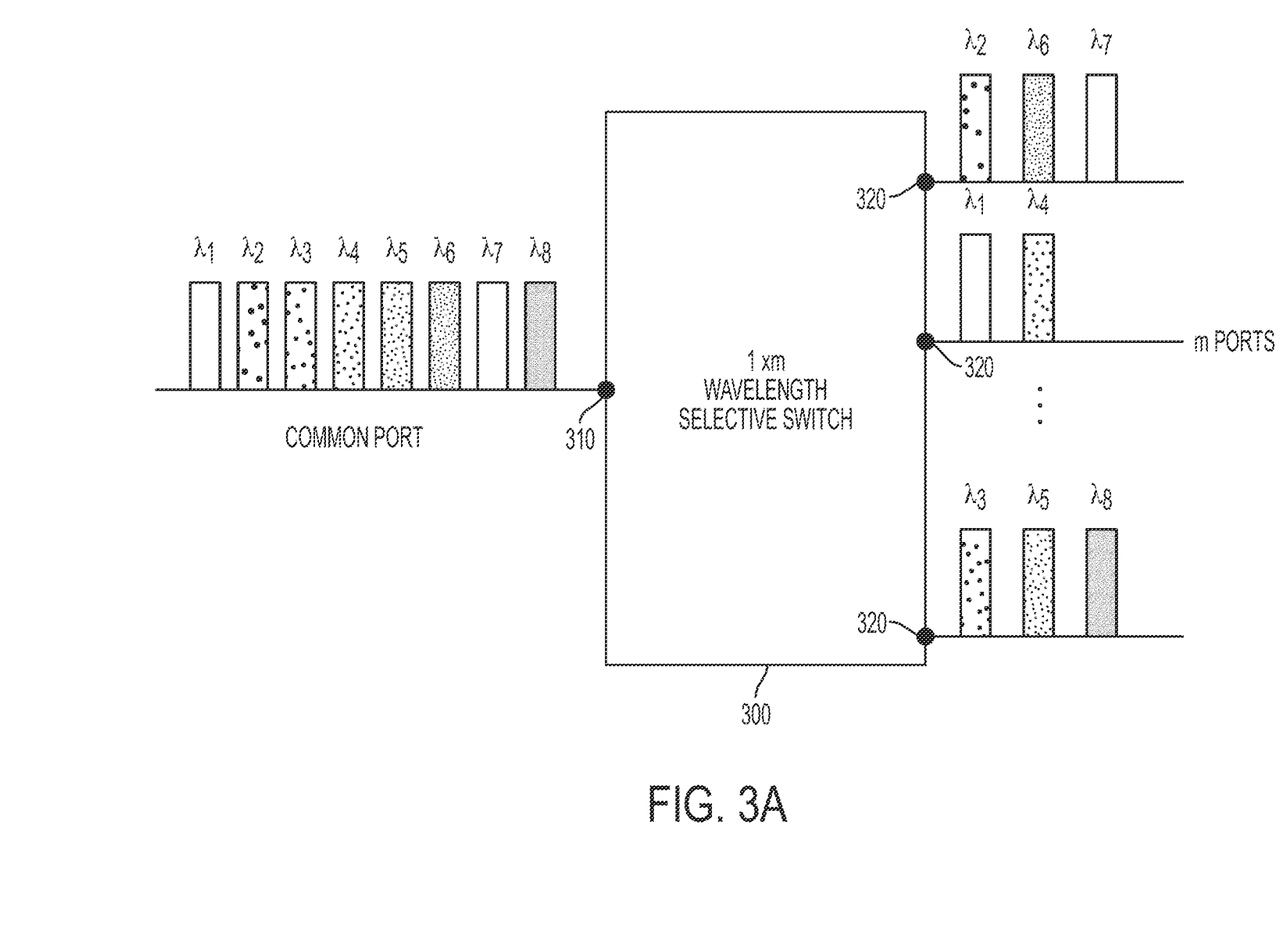
FIGS. 3A and 3B show diagrams illustrating functionality and structure of an example wavelength selective switch (WSS)
Figure 3B:
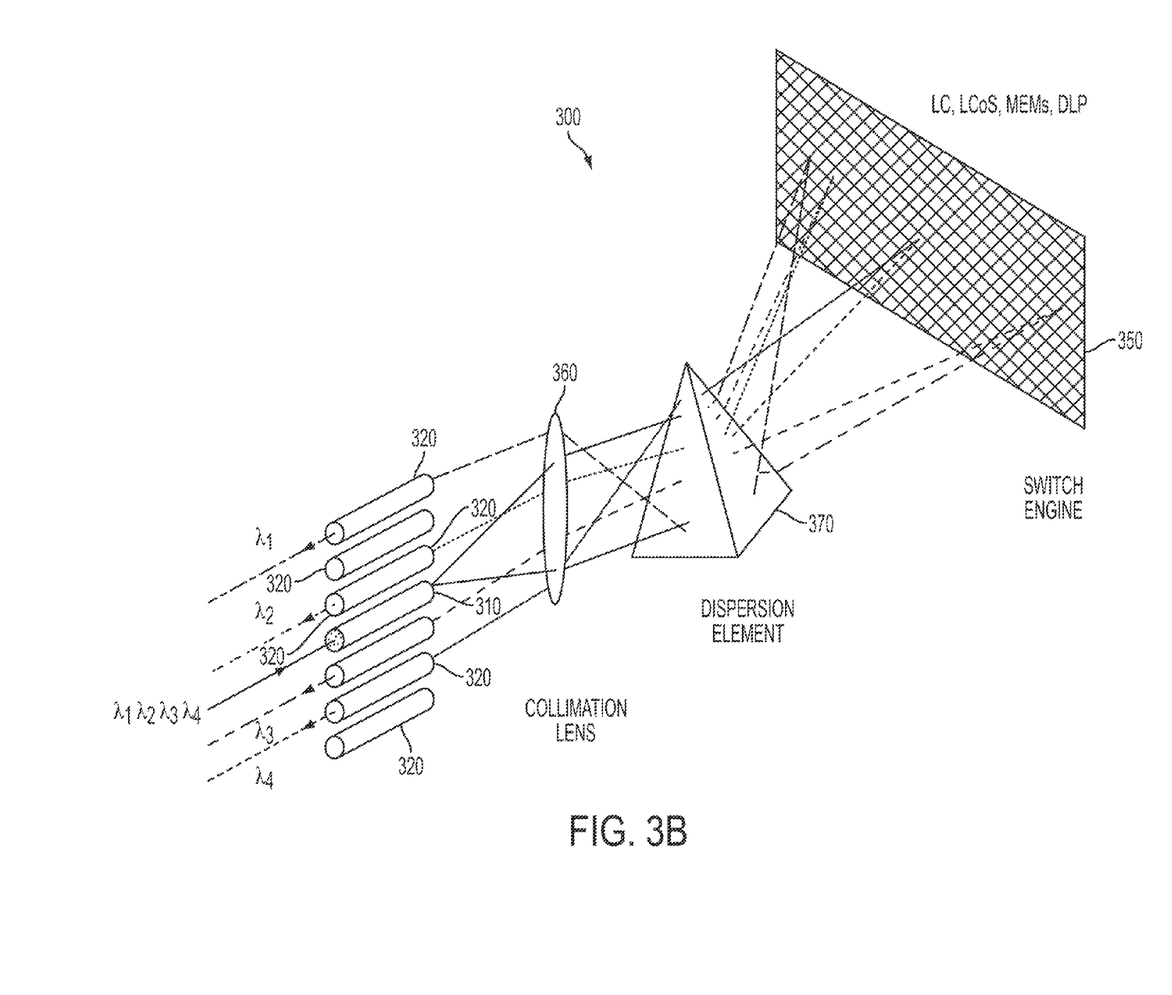

FIGS. 3A and 3B show diagrams illustrating the functionality and structure of an example wavelength selective switch (WSS) 300. Referring to FIG. 3A, a WSS 300 includes a common port 310 and multiple switch ports 320. The WSS 300 is capable of receiving and/or transmitting wavelength division multiplexed (WDM) wavelength channels over its common port 310. The WSS 300 is configured to switch or direct a plurality of WDM wavelength channels received over its common port 310 such as the wavelength channels $\lambda_1$-$\lambda_8$ to its switch ports 320. In such a case, the common port 310 act as a single input port and the switch ports 320 acts as output ports. The switching of the plurality of WDM wavelength channels from the common port 310 to the switch ports can follow the following rules; (1) each received WDM wavelength channel is switched to one of the switch ports 320, and (2) no WDM wavelength channel received over the common port 310 is switched to more than one switch port 320. In the scenario shown in FIG. 3A, eight wavelength channels $\lambda_1$-$\lambda_8$ are received over the common port 310. The wavelength channels $\lambda_2$, $\lambda_6$, and $\lambda_7$ are switched to a single switch port 320, the wavelength channels $\lambda_1$ and $\lambda_4$ are switched to another switch port 320, and the wavelength channels $\lambda_3$, $\lambda_5$, and $\lambda_8$ are switched to yet another switch port 320. While FIG. 3A shows the WSS 300 switching eight wavelength channels, many DWDM WSS devices can simultaneously switch dozens, and in some cases, more than 100 wavelength channels across its switch ports 320.

A WSS 300 can also receive wavelength channels from its switch ports 320, multiplex the received wavelength channels, and switch the multiplexed wavelength channels over the common port 310. In such a case, the switch ports 320 act as input ports and the common port 310 acts as a single output port. In order to provide bi-directional communication, a pair of WSSs can be employed with one WSS having its common port act as an input port and the other WSS having its common port act as an output port.

Referring to FIG. 3B, the WSS 300 includes a switch engine 350, a collimation lens 360, and a dispersion element 370 besides the common port 310 and the switch ports 320 (both discussed above with respect to FIG. 3A).

The engine switch 350 is configured to spatially direct the light of each wavelength channel between the common port 310 and the switch ports 320 by changing the angle or position of the optical beam of the wavelength. The switch engine 350 can include a micro-electromechanical system (MEMS) mirror array. Angles of MEMS reflective mirrors in the MEMS mirror array are capable of being adjusted allowing directions of light beams reflected from different MEMS reflective mirrors to be independently modified.

A light beam of multiplexed wavelength channels received over the common port 310 passes through the collimating lens 360. The collimating lens 360 collimates the light beam and directs it to the dispersion element 370. Upon exiting the collimating lens 360, the light beam passes through the dispersion element 370. The dispersion element 370 is capable of changing the relative angle of light propagation in a wavelength dependent fashion. That is, light beams of different wavelengths exit the dispersion element 370 at different angles and therefore are directed to different portions of the switch engine. Each light associated with a wavelength channel is reflected in a direction defined by a respective angle redirector in the switch engine 350.

The reflected light beams associated with different wavelength channels pass back through the dispersion element 370 and the collimating lens 360 to reach respective designated switch ports 320. In the case where the switch ports 320 act as input ports, the light beams associated with different wavelength channels go through the same process to be all directed to the common port 310. While the effect of the collimating lens 360 and the dispersion element 370 on the traversing light colors is fixed, the switch engine 350 acts in a dynamically configurable way to adjust the path of light beams associated with different wavelength channels according to a switching configuration defined by a switch logical topology provided by an external network controller (shown in FIG. 5).

A person of ordinary skill in the art would appreciate that the WSS 300 can be implemented using different light redirection technologies other than MEMS mirrors. In some implementations, the WSS 300 can include a liquid crystal (LC) switch engine having a stack of consecutive pairs of LC cells and polarization splitting elements for adjusting direction of light for each wavelength channel. In some implementations, the WSS can include a liquid crystal on silicon (LCoS) switch engine having an array of phase controlled pixels for steering light of each wavelength channel. Other WSSs employ other technologies for directing light beams associated with different wavelength channels between the common port 310 and the switching ports 320. Regardless of the technology employed, the WSS 300 is capable of dynamically switching light colors associated with different wavelength channels between the common port 310 and the switch ports 320.

Figure 4:
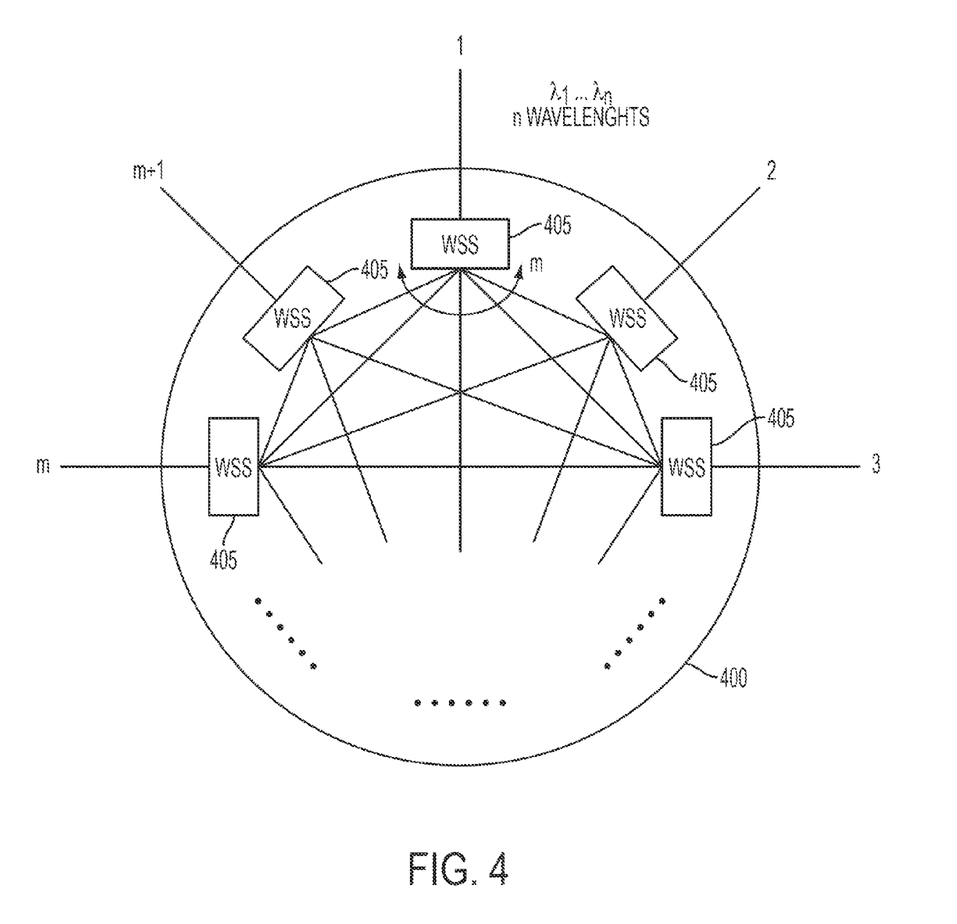
FIG. 4 shows an architecture of an example WSS mesh network.

FIG. 4 shows an architecture of an example WSS mesh network 400. The WSS mesh network 400 includes m+1 pairs of wavelength selective switches (WSSs) 405 where m is an integer number. Each WSS pair 405 includes two WSSs, each of which has a common port 310 and m switch ports 320. In the architecture illustrated in FIG. 4, each WSS pair 405 includes a first WSS with its respective common port 310 acting as an input port and its respective switch ports 320 acting as output ports, and a second WSS with its respective common port 310 acting as an output port and its respective switch ports 320 acting as input ports. Each WSS pair 405 is coupled to all other WSS pairs 405 through respective switch ports 320. Specifically, each first WSS (with respective switch ports 320 acting as output ports) in a WSS pair 405 is coupled through its switch ports 320 to all second WSSs (with respective switch ports 320 acting as input ports) in all other WSS pairs 405 of the WSS mesh network 400. Also, each second WSS (with respective switch ports 320 acting as input ports) in a WSS pair 405 is coupled through its switch ports 320 to all first WSSs (with respective switch ports 320 acting as output ports) in all other WSS pairs 405 of the WSS mesh network 400. That is, the WSS mesh network 400 is a fully connected network. In some implementations, the WSS mesh network 400 can be not fully connected. For instance, if m is the number of switch ports 320 in each WSS of a WSS pair 405, the number of WSS pairs 405 can be larger than m+1. In such configurations, each WSS pair 405 is coupled to subset of the WSS pairs 405 in the WSS mesh network 400.

Referring to FIGS. 2, 3A, 3B, and 4, the wavelength channels received at a common port 310 of any first WSS (of a WSS pair 405) can be routed to be output at the common port 310 of any second WSS (with common port 310 acting as output port) of the other WSS pairs 405. By properly configuring each WSS 405, a different number of wavelength channels can be routed between different server groups 201 through different links coupling WSS pairs 405 to realize a dynamic bandwidth allocation. The switch engine 350 of each WSS can use received switch topology information to adjust the paths of light beams associated with respective wavelength channels.

The flexibility of the physical topology (shown in FIG. 2) introduced by the DWDM switches 245 and the WSS mesh network architecture 400 enables an incremental build out of server groups to gradually expand the data center for a very large facility without compromising performance. The physical topology shown in FIG. 2 also allows for reduction in interconnect links within a data center network. For instance, if the multiplexing factor of the DWDM multiplexers/de-multiplexers 250 is n (packing n wavelength channels onto a pair of single-mode fibers), the reduction of fiber count for the deployment is factor n assuming a fixed data rate per channel. Considering existing DWDM technologies, n can be as large as 100. Optical amplifiers can be deployed with WSS pairs 405 to compensate for optical component loss such as mux/demux, wavelength selective switching, fiber connector loss, etc.

The total capacity that can be supported by a WSS mesh network with m+1 WSS pairs 405, is determined by the following: $(m+1) \times r \times n$ where r is the WDM channel speed (data rate) and n is the WDM channel count. In existing WSS products, m can be up to about 20 and r and n are determined by a chosen WDM technology. If a data center capacity demand—B—is larger than the supported capacity by the WSS mesh network 400 built based on certain WSS and DWDM technologies, additional WSS mesh networks 400 can be deployed to meet the capacity demand B. For instance, if k WSS mesh networks 400 are used, the respective capacity is $k \times (m+1) \times r \times n$. The number of WSS mesh networks k can be chosen to satisfy $k \times (m+1) \times r \times n \geq B$. Using multiple WSS mesh networks 400 improves network scalability and improves the data center network fault tolerance as well, i.e. failure of one WSS mesh network 400 will take down only 1/k of the total network capacity.

In some implementations, deploying additional WSS mesh networks 400 includes adding more DWDM switches (such as the DWDM switches 245 shown in FIG. 2) associated with respective server groups 201 (also shown in FIG. 2) and coupling the additional WSS mesh networks 400 to the added DWDM switches. In a multi-WSS mesh network topology such as the one discussed below in relation to FIG. 5, multiple WSS mesh networks 400 can be coupled in parallel to the server blocks 201. In such topology, a single wavelength can be used for distinct wavelength channels directed to different WSS mesh networks 400. In other words, wavelength re-use can be employed in the absence of wavelength contention.

Figure 5:
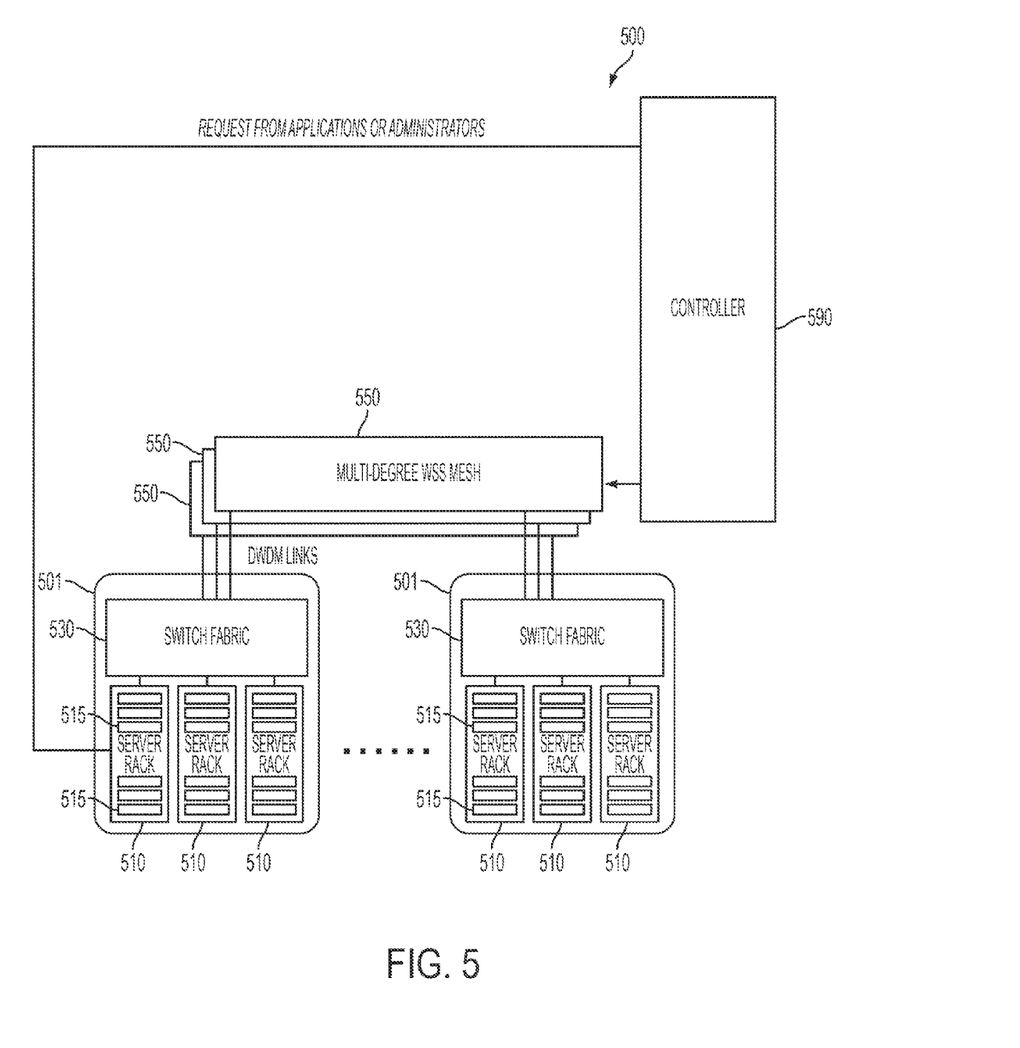
FIG. 5 shows another example architecture of a data center network allowing dynamic allocation of communication bandwidth.

FIG. 5 shows another example architecture of a data center network 100 allowing dynamic allocation of communication bandwidth. The data center network includes a plurality of server groups 501, multiple WSS mesh networks 550, and a controller 590.

The server groups 501 are similar in terms of functionality and architecture to the server groups 201 discussed with respect to FIG. 2. Each server group 501 includes a plurality of server racks 510 and a switch fabric 530. Each server rack 510 includes multiple servers 515. The server racks 510 in a given server group 501 are coupled to each other through the switch fabric 530. The switch fabric 530 for each server group 501 is coupled to the multiple WSS mesh networks 550 through optical fibers 549. The switch fabric 530 may be viewed as a combination of the aggregation fabric 230 and the DWDM switches 245 (both described with respect to FIG. 2).

Each of the WSS mesh network 550 has an architecture similar to the architecture of the WSS mesh network 400 described with respect to FIG. 4. The WSS mesh networks are coupled to the server groups and are configured to route wavelength channels carrying data traffic between different server groups 501. The WSS mesh networks 550 are capable of being configured by the controller 590 in terms of how to route wavelength channels between different server groups 501.

The controller 590 can be a computer server, a processor, or an electronic device of another type. The controller 590 is coupled to the server racks 510 or to individual servers 515 in each server group 501. The controller 590 can be coupled to the server racks 510 or servers 515 directly, through the switch fabrics 530, or via a separate control plane network. The controller can also be coupled to the multiple WSS mesh networks 550 and to other network elements in the switch fabrics 530 such as the DWDM multiplexers/de-multiplexers 250, the top tier switches 240, switches 231, or any other network elements associated with the server groups 201 described with respect to FIG. 2. The controller 590 is configured to obtain indications of communication bandwidth demand between the multiple groups of servers 501 and configure the WSS mesh networks 550 according to the obtained indications of communication bandwidth demand. In some implementations, the controller is configured to further configure one or more network elements such as the DWDM switches 245 (described with respect to FIG. 2) based on the obtained indications of communication bandwidth demand. More detailed description of the functionalities of the controller are described below with respect to FIG. 6.

Figure 6:
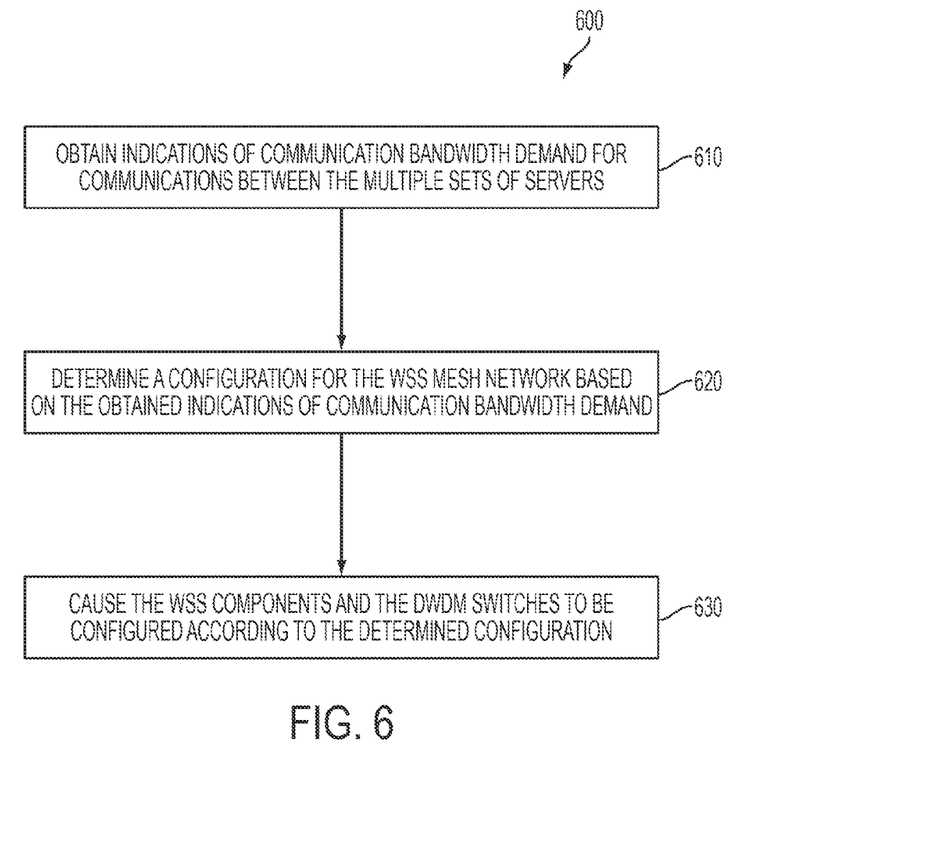
FIG. 6 shows a flow diagram illustrating a process of controlling a data center network.

FIG. 6 shows a flow diagram illustrating a process 600 of controlling a data center network. The process 600 includes obtaining indications of communication bandwidth demand for communications between the multiple sets of servers (stage 610), determining a configuration for the WSS mesh network 550 (shown in FIG. 5) based on the obtained indications of communication bandwidth demand (stage 620), and causing the WSS pairs 405 (shown in FIG. 4) and the DWDM switches 245 (shown in FIG. 2) to be configured according to the determined configuration (stage 630).

Referring to FIGS. 2-6, the controller 590 obtains indications of communication bandwidth demand for communications between the multiple server groups 501 (stage 610). The controller 590 may obtain the indications from the servers 515, the TOR switches (shown in FIG. 2), or any other network elements associated with the server groups 501. For instance, the controller can obtain information indicative of communication bandwidth demand on a server by server basis or based on a higher level aggregation of servers. The obtained indications may be in terms of data rate, number of communications flows, number of wavelength channels, or in other units/metrics for measuring communication bandwidth. Communication demand herein refers to server to server demand or aggregation (of servers) to aggregation (of servers) demand.

Upon obtaining the indications of communication bandwidth demand, the controller 590 determines configurations for the WSS mesh networks 550 based on the obtained indications of communication bandwidth demand (stage 620). In some implementations, the data center network 500 includes a single WSS mesh network 550 for which a respective configuration is determined by the controller 590 (stage 620). In some implementations, determining a configuration for a WSS mesh network 550 includes determining the wavelength channels (and their respective wavelengths) to be received at each common port 310 of each first WSS 300 (with respective common port acting as input port) in the WSS mesh network 550, and how the wavelength channels are to be switched between the common port 310 and the switch ports 320 of the first WSS 300. In other words, the controller 590 is configured to determine the wavelength channels (in terms of their number and/or their respective wavelengths) to be assigned to each inter-server group route and through which WSS pairs 405 the wavelength channels assigned to a server group 501 are to arrive at the WSS mesh network 550. In some implementations, the controller stores information regarding the topology of the WSS mesh network 550 such as which WSSs are coupled to which respective server groups 590.

In terms of wavelength channel switching between the common port 310 and the switch ports 320 at each first WSS of a WSS pair 405, the controller is configured to determine how many and which wavelength channels received at the common port 310 of each first WSS (within the WSS pairs 405) are to be switched to the respective switch ports 320.

The controller 590 then causes the WSS pairs 405 and the DWDM switches 245 to be configured according to the determined configuration (stage 630). In some implementations, the controller 590 sends indications/instructions to each WSS pair 405 indicative of pattern(s) for switching wavelength channels between the respective common port 310 and the respective switch ports 320 of the respective first WSS. Such instructions/indications can include a data structure such as a tree, a table, or any other data structure to describe the mapping between received wavelength channels and corresponding switch ports 320 to which to be directed. Each first WSS (in a WSS pair 405), is configured to translate the received switch pattern from the controller 590 into a configuration of the respective switch engine 350. For instance, a MEMS-based switch engine 350 adjusts angles of its MEMS reflective mirrors to cause light colors associated with different wavelength channels to be directed according to the switch pattern received from the controller 590. In some implementations, other types of switch engines configure one or more of their respective adjustable elements to direct light colors associated with different wavelength channels to corresponding ports of the WSS according to the switch pattern received from the controller 590.

In some implementations, the controller 590 sends instructions/indications to the DWDM switches 245 indicative of the wavelengths to be used for forwarding data traffic to a WSS mesh network 550 based on the destination server group. The instructions/indications received from the controller 590 can be used by the top tier switch 240 (or any media converter coupling the top tier switch to the respective DWDM multiplexer/de-multiplexer 250) to determine which wavelengths are to be used when converting electronic (or optical) data traffic to DWDM optical wavelength channels.

In some implementations, the controller can be configured to determine the number of wavelengths to be assigned to each route between a respective pair of server groups 501, a respective pair of server racks 510, and/or a respective pair of servers 515. The controller 590 can send instructions/indications to one or more network elements of a respective server group 501 regarding which data flows are to be packed in together in a single wavelength channel. In some implementations, the number of wavelength channels is determined at the server group 501 and sent to the controller 590 as part of the indications of communication bandwidth demand.

In determining the number of wavelength channels to be assigned to each pair of server groups 501, each pair of server racks 510, and/or each pair of servers 515 based on obtained indications of communication bandwidth demand and configuring the WSS mesh network 550 accordingly, the controller 590 dynamically assigns communication bandwidth between such pairs of network entities. Also, the controller dynamically configures the wavelength and route topology of the wavelength channels since the controller 590 can determine which wavelengths are to be assigned to which data traffic and how the respective wavelength channel is routed within the WSS mesh network 550.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A network system comprising:
   a wavelength selective switch (WSS) mesh network including a plurality of WSS components, each WSS component including a common port and multiple switching ports, the plurality of WSS components being coupled to each other through corresponding switching ports;
   multiple dense wavelength-division multiplexing (DWDM) multiplexers/de-multiplexers, wherein each DWDM multiplexer/de-multiplexer is:
      coupled to one of multiple sets of servers via a respective top tier switch, respective aggregation nodes, and respective top-of-rack switches, wherein each aggregation node is coupled to a plurality of top-of-rack switches, and
      coupled to a common port of a WSS component of the WSS mesh network; and
   a controller configured to:
      obtain indications of communication bandwidth demand for communications between the multiple sets of servers;
      determine a configuration for the WSS mesh network based on the obtained indications of communication bandwidth demand; and
      cause the WSS components and, the top tier switches to be configured according to the determined configuration.

2. The network system of claim 1, wherein in determining the one or more configurations, the controller is further configured to:
   assign respective wavelengths to each of a plurality of routes between the sets of servers, wherein the number of wavelengths assigned between a pair of respective WSS components is determined based on the indicated bandwidth demand for communications between the sets of servers coupled to the respective common ports of the respective pair of WSS components.

3. The network system of claim 2, wherein in determining the configurations, the controller is further configured to:
   for a WSS component of the WSS mesh network, assign each wavelength to be received at the common port of the WSS component to a corresponding switching port of the WSS component on which the wavelength is to be output.

4. The network system of claim 3, wherein in causing the WSS component to be configured according to the determined configuration, the controller is further configured to:
   provide to the WSS component indications of a switch pattern for switching wavelength channels between the respective common port and the respective switch ports of the WSS component.

5. The network system of claim 4, wherein a number of WSS component pairs in the WSS mesh network is equal to the number of switching ports in each WSS component plus one.

6. The network system of claim 1, wherein the aggregation nodes include a packet switching fabric.

7. The network system of claim 6, wherein the packet switching fabric includes a plurality of packet switches.

8. The network system of claim 1, wherein the network system includes multiple WSS mesh networks.

9. The network system of claim 8, wherein the multiple WSS mesh networks are coupled in parallel to the multiple sets of servers via the multiple DWDM multiplexers/de-multiplexers and respective top tier switches.

10. A method of controlling a network system including a wavelength selective switch (WSS) mesh network and multiple dense wavelength-division multiplexing (DWDM) multiplexers/de-multiplexers, each DWDM multiplexer/de-multiplexer being coupled to a respective set of servers through a respective top tier switch, respective aggregation nodes, and respective top-of-rack switches, wherein each aggregation node is coupled to a plurality of top-of-rack switches, the method comprising:
obtaining, by a processor, indications of communication bandwidth demand for communications between the multiple sets of servers;
determining a configuration for the WSS mesh network based on the obtained indications of communication bandwidth demand; and
causing WSS components of the WSS mesh network and the top tier switches to be configured according to the determined configuration,
the wavelength selective switch (WSS) mesh network includes a plurality of WSS components, each WSS component including a common port and multiple switching ports, the plurality of WSS components being coupled to each other through corresponding switching ports, each DWDM multiplexer/de-multiplexer being coupled to one of multiple sets of servers via the respective top tier switch, respective aggregation nodes, and respective top-of-rack switches and coupled to a common port of a WSS component of the WSS mesh network.

11. The method of claim 10, wherein determining the one or more configurations includes:
assigning respective wavelengths to each of a plurality of routes between the sets of servers, wherein the number of wavelengths assigned between a pair of respective WSS components is determined based on the indicated bandwidth demand for communications between the sets of servers coupled to the respective common ports of the respective pair of WSS components.

12. The method of claim 11, wherein determining the configurations includes:
for a WSS component of the WSS mesh network, assigning each wavelength to be received at the common port of the WSS component to a corresponding switching port of the WSS component on which the wavelength is to be output.

13. The method of claim 12, wherein causing the WSS component to be configured according to the determined configuration includes:
providing to the WSS component indications of a switch pattern for switching wavelength channels between the respective common port and the respective switch ports of the WSS component.

14. The method of claim 10, wherein the WSS mesh network is a fully connected network.

15. The method of claim 14, wherein a number of WSS component pairs in the WSS mesh network is equal to the number of switching ports in each WSS component plus one.

16. The method of claim 10, wherein the aggregation nodes include a packet switching fabric.

17. The method of claim 16, wherein the packet switching fabric includes a plurality of packet switches.

18. The network system of claim 1, wherein the network system includes multiple WSS mesh networks coupled in parallel to the multiple sets of servers via the multiple DWDM multiplexers/de-multiplexers and respective top tier switches.

19. A non-transitory computer-readable medium within computer code instructions stored thereon for controlling a network system including a wavelength selective switch (WSS) mesh network and multiple dense wavelength-division multiplexing (DWDM) multiplexers/de-multiplexers, each DWDM multiplexer/de-multiplexer being coupled to a respective set of servers through a respective top tier switch, respective aggregation nodes, and respective top-of-rack switches, wherein each aggregation node is coupled to a plurality of top-of-rack switches, the computer code instructions when executed by a processor cause an apparatus to:
obtain indications of communication bandwidth demand for communications between the multiple sets of servers;
determine a configuration for the WSS mesh network based on the obtained indications of communication bandwidth demand; and
cause WSS components of the WSS mesh network and the top tier switches to be configured according to the determined configuration,
the wavelength selective switch (WSS) mesh network includes a plurality of WSS components, each WSS component including a common port and multiple switching ports, the plurality of WSS components being coupled to each other through corresponding switching ports, each DWDM multiplexers/de-multiplexers being coupled to one of multiple sets of servers via the respective top tier switch, respective aggregation nodes, and respective top-of-rack switches and coupled to a common port of a WSS component of the WSS mesh network.

* * * * *